(12) United States Patent
Furo et al.

(10) Patent No.: US 6,664,330 B2
(45) Date of Patent: Dec. 16, 2003

(54) WATERBORNE RESIN EMULSION AND WATERBORNE COATING

(75) Inventors: Masahito Furo, Osaka (JP); Shin'ichi Kuwamura, Kitakatsuragi-gun (JP)

(73) Assignee: Dainippon and Chemicals, Inc., Tokyo (JP)

( * ) Notice: Subject to any disclaimer, the term of this patent is extended or adjusted under 35 U.S.C. 154(b) by 89 days.

(21) Appl. No.: 09/971,811

(22) Filed: Oct. 9, 2001

(65) Prior Publication Data

US 2002/0065362 A1 May 30, 2002

(30) Foreign Application Priority Data

Oct. 11, 2000 (JP) ...................... P2000-310511

(51) Int. Cl.⁷ .............................. C08G 77/18
(52) U.S. Cl. ................ 524/837; 525/100; 524/858; 524/804; 524/806; 528/12; 526/219.6; 526/227; 526/232.1
(58) Field of Search ................ 525/100; 524/858, 524/804, 806; 528/12; 526/219.6, 227, 232.1

(56) References Cited

U.S. PATENT DOCUMENTS 4,731,388 A * 3/1988 Matsui et al.
4,761,452 A * 8/1988 Itoh et al.
5,385,975 A * 1/1995 Nakamura et al.
5,852,095 A * 12/1998 Yamauchi et al.

FOREIGN PATENT DOCUMENTS

| EP | 0 449 263 A2 | 10/1991 |
| EP | 0 757 059 A1 | 2/1997 |
| JP | 4-57868 | 2/1992 |
| JP | 6-256522 | 9/1994 |
| JP | 8-3409 | 1/1996 |

* cited by examiner

Primary Examiner—Kuo-Liang Peng
(74) Attorney, Agent, or Firm—Armstrong, Westerman & Hattori, LLP

(57) ABSTRACT

An emulsion of a monomer having a radical polymerizable unsaturated bond, which is obtained by emulsifying the monomer in the presence of an emulsifier, and a mixed solution of a specific non-radical polymerizable organosilicon compound and a polymerization initiator, which is soluble in the non-radical polymerizable organosilicon compound, are added to an aqueous medium, followed by emulsion polymerization, hydrolysis, and condensation, to produce a waterborne resin emulsion and a waterborne coating which can form a coating film having superior durability such as water resistance, weathering resistance, or the like.

10 Claims, No Drawings

WATERBORNE RESIN EMULSION AND WATERBORNE COATING

BACKGROUND OF THE INVENTION

1. Field of the Invention

The present invention relates to a waterborne resin emulsion and a waterborne coating, and more particularly, to a waterborne resin emulsion and a waterborne coating which are suitable for use as coatings, especially building exterior coatings and coatings for various building materials for external use in which excellent water resistance and weathering resistance are required.

2. Description of Related Art

In view of reduction of environmental impact and improvement in safety and health, building exterior coatings and coatings for various building materials for external use have been replaced at an accelerating pace by waterborne coatings. Whereby, conventional organic solvent resins, as resins for coatings used therein, have been replaced by waterborne resins.

Since building exterior coatings are used outdoors and the coating film is exposed, those having resistance to various environmental factors such as sunlight and rainwater have been required. As waterborne coatings, those having superior performances suitable for these requirements have been required. Among raw materials for waterborne coatings, a waterborne resin emulsion is most important because it exerts an influence on a superior performances.

However, coating films obtained from waterborne resin emulsions such as acrylic emulsion or coatings prepared by mixing waterborne resin emulsions with pigments had poor durability to various environmental factors.

Although various methods of enhancing durability by introducing a silicone structure into a waterborne resin emulsion have been suggested to solve this problem, the durability was not always satisfactory.

For example, Japanese Unexamined Patent Application, First Publication Hei 4-57868, Japanese Unexamined Patent Application, First Publication Hei 6-256522 and Japanese Unexamined Patent Application, First Publication Hei 8-3409 discloses those in which a silicone structure is introduced into a waterborne resin emulsion by using an alkoxysilane compound or a modifier having a silicone structure in the emulsion polymerization, while the emulsion polymerization is carried out by introducing a polymerization initiator used in the emulsion polymerization in a reaction vessel after the polymerization initiator was mixed with a monomer emulsion or dissolved in deionized water. Although a waterborne resin emulsion can be obtained by this method in the case of a water-soluble polymerization initiator, the content of silicone in particles of the resulting waterborne resin emulsion becomes nonuniform and the coating film obtained by coating with the coating containing the waterborne resin emulsion is inferior in water resistance and long-term weathering resistance. In the case of an oil-soluble polymerization initiator, the desired waterborne resin emulsion cannot be obtained because of a large numbers of blocks during the polymerization.

BRIEF SUMMARY OF THE INVENTION

An object of the present invention is to provide a waterborne resin emulsion and a waterborne coating, which can form a coating film having excellent durability such as water resistance, weathering resistance or the like, by using a polymerization initiator which is soluble in an organosilicon compound having a specific structure.

To obtain a waterborne coating capable of forming a coating film having excellent durability, the present inventors have intensively researched and have found that the waterborne coating capable of forming a coating film having superior durability can be obtained by adding an emulsion of a radical polymerizable unsaturated monomer, which is obtained by emulsifying the monomer in the presence of an emulsifier, and a mixed solution of a specific non-radical polymerizable organosilicon compound and a polymerization initiator, which is soluble in the non-radical polymerizable organosilicon compound, in an aqueous medium, followed by emulsion polymerization as well as hydrolysis and condensation. Thus, the present invention has been completed.

The present invention provides a waterborne resin emulsion obtained by adding an emulsion (a) of a monomer having a radical polymerizable unsaturated bond, which is obtained by emulsifying the monomer in the presence of an emulsifier, and a mixed solution (b) of a non-radical polymerizable organosilicon compound represented by the following formula:

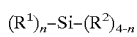

$(R^1)_n\text{-Si-}(R^2)_{4-n}$ (wherein n represents an integer of 1 to 3, $R^1$ represents an alkyl, cycloalkyl or aryl group having 1 to 16 carbon atoms, and $R^2$ represents an alkoxy group having 1 to 8 carbon atoms or a hydroxyl group) and a polymerization initiator, which is soluble in the non-radical polymerizable organosilicon compound, in an aqueous medium; and simultaneously carrying out emulsion polymerization of the monomer having a radical polymerizable unsaturated bond and hydrolysis and condensation of the non-radical polymerizable organosilicon compound.

The present invention also provides a waterborne coating comprising a waterborne resin emulsion obtained by adding an emulsion (a) of a monomer having a radical polymerizable unsaturated bond, which is obtained by emulsifying the monomer in the presence of an emulsifier, and a mixed solution (b) of a non-radical polymerizable organosilicon compound represented by the following formula:

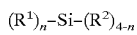

$(R^1)_n\text{-Si-}(R^2)_{4-n}$ (wherein n represents an integer of 1 to 3, $R^1$ represents an alkyl, cycloalkyl or aryl group having 1 to 16 carbon atoms, and $R^2$ represents an alkoxy group having 1 to 8 carbon atoms or a hydroxyl group) and a polymerization initiator, which is soluble in the non-radical polymerizable organosilicon compound, in an aqueous medium; and simultaneously carrying out emulsion polymerization of the monomer having a radical polymerizable unsaturated bond and hydrolysis and condensation of the non-radical polymerizable organosilicon compound.

The waterborne resin emulsion of the present invention has superior durability and weathering resistance. Therefore, the waterborne resin emulsion of the present invention is suitable for use as resins for especially building exterior coatings and coatings for various building materials for external use in which high water resistance and weathering resistance are required. The waterborne coating of the present invention is suitable for use as building exterior coatings and coatings for various building materials for exterior use.

DETAILED DESCRIPTION OF THE INVENTION

The present invention will now be described in more detail.

First, the emulsion (a) of a monomer having a radical polymerizable unsaturated bond used in the present invention (hereinafter referred to as an "emulsion (a) of a monomer") will be described.

The emulsion (a) of a monomer is obtained by adding a monomer having a radical polymerizable unsaturated bond in an aqueous medium in which an emulsifier was dissolved, followed by mixing.

As the monomer having a radical polymerizable unsaturated bond, any monomer can be used without limitation as long as it is conventionally used in emulsion polymerization.

Examples thereof include acrylic acid esters such as methyl acrylate, ethyl acrylate, isopropyl acrylate, n-butyl acrylate, and 2-ethylhexyl acrylate; methacrylic acid esters such as methyl methacrylate, ethyl methacrylate, isopropyl methacrylate, n-butyl methacrylate, isobutyl methacrylate, t-butyl methacrylate, cyclohexyl methacrylate, and 2-ethylhexyl methacrylate; crotonic acid esters such as methyl crotonate and ethyl crotonate; carboxyl group-containing monomers such as acrylic acid, methacrylic acid, maleic acid, fumaric acid, itaconic acid, mono-n-butyl maleate, mono-n-butyl fumarate, mono-n-butyl itaconate, and crotonic acid; vinyl esters such as vinyl acetate, vinyl propionate, and vinyl tertiary carbonate; aromatic vinyl compounds such as styrene, vinyltoluene, or α-methylstyrene; heterocyclic vinyl compounds such as vinyl pyrrolidone; halogenated olefins such as vinyl chloride, vinylidene chloride, and vinylidene fluoride; cyano group-containing monomers such as acrylonitrile or methacrylonitrile; vinyl ethers such as ethyl vinyl ether and isobutyl vinyl ether; vinyl ketones such as methyl vinyl ketone; α-olefins such as ethylene and propylene; dienes such as butadiene and isoprene; amide group-containing monomers such as acrylamide, methacrylamide, amide maleimide, N-methylolacrylamide, N-methylolmethacrylamide, and diacetoneacrylamide; glycidyl group-containing monomers such as glycidyl methacrylate and allyl glycidyl ether; hydroxyl group-containing monomers such as 2-hydroxyethyl acrylate, 2-hydroxyethyl methacrylate, and 2-hydroxypropyl methacrylate; amino group-containing monomers such as dimethylaminoethyl methacrylate and diethylaminoethyl methacrylate; alkoxysilyl group-containing monomers such as vinyltrimethoxysilane, vinyltriethoxysilane, vinyltriisopropoxysilane, vinyltris(β-methoxyethoxy)silane, vinylmethyldimethoxysilane, vinylmethyldiethoxysilane, vinyldimethylmethoxysilane, vinyldimethylethoxysilane, 3-methacryloypropyltrimethoxysilane, 3-methacryloypropyltriethoxysilane, 3-methacryloypropylmethyldimethoxysilane, and 3-methacryloypropylmethyldiethoxysilane; and monomers having two or more unsaturated bonds in a molecule, such as diallyl phthalate, divinylbenzene, allyl acrylate, and trimethylolpropane trimethacrylate. These monomers having a radical polymerizable unsaturated bond are used alone or in combination. Among these monomers, a monomer containing 30 to 70% by weight of a methacrylic acid ester whose alkyl group has 4 or more carbon atoms is preferred.

As the emulsifier in the present invention, any of anionic, cationic, and nonionic emulsifiers can be used without any limitation as long as it is conventionally used in emulsion polymerization. Typical examples of the anionic emulsifier include sulfuric acid ester of higher alcohol, alkylbenzene sulfonate, polyoxyalkylene alkyl phenyl ether sulfate, dialkyl succinate sulfonate, and alkyl diphenyl ether disulfonate. Typical examples of the cationic emulsifier include alkyltrimethylammonium chloride, dialkyldimethylammonium chloride, and alkylbenzyldimethylammonium chloride. Typical examples of the nonionic emulsifier include polyoxyalkylene alkyl ether and polyoxyalkylene alkyl phenyl ether. In the present invention, these surfactants can be used alone or in combination.

An emulsifier having a radical polymerizable unsaturated group referred generally to as a reactive emulsifier can also be used. Typical examples thereof include "LATEMUL S-180" (manufactured by Kao Corporation) or "Ereminol JS-2" (manufactured by Sanyo Chemicals) which has a sulfonic acid group or a salt thereof; "HITENOL HS-10" (manufactured by Daiichi Kogyo Seiyaku Co., Ltd.) or "Adeka riasoap SE-10N" (manufactured by Asahi Denka Kogyo K.K.) which has a sulfuric acid or a salt thereof; and "New Frontier A-229E" (manufactured by Daiichi Kogyo Seiyaku Co., Ltd.) which has a phosphoric acid. In the present invention, these surfactants can be used alone or in combination. In view of dispersion of the pigment in the coatings and storage stability, an emulsifier having no reactivity is preferably used. When using a reactive emulsifier, it is preferably used in combination with the emulsifier having no reactivity.

The mixed solution (b) of a non-radical polymerizable organosilicon compound represented by the following formula:

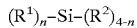

$$(R^1)_n\text{-Si-}(R^2)_{4-n}$$

(wherein n represents an integer of 1 to 3, $R^1$ represents an alkyl, cycloalkyl or aryl group having 1 to 16 carbon atoms, and $R^2$ represents an alkoxy group having 1 to 8 carbon atoms or a hydroxyl group) and a polymerization initiator, which is soluble in the non-radical polymerizable organosilicon compound, will now be described.

The polymerization initiator used in the present invention is not specifically limited as long as it is soluble in the non-radical polymerizable organosilicon compound. The polymerization initiator used in the present invention is preferably a polymerization initiator whose decomposition temperature for achieving a half life of 10 hours is 75° C. or lower, and more preferably is 60° C. or higher. When using the polymerization initiator, which is soluble in the non-radical polymerizable organosilicon compound, the coating film of the resulting waterborne resin emulsion has highly superior durability. When using the polymerization initiator whose decomposition temperature for achieving a half life of 10 hours is 75° C. or lower, the polymerization reaction proceeds satisfactorily without drastically reducing the polymerization rate, thus obtaining a waterborne resin emulsion in a stable manner.

Typical examples of the polymerization initiator, which can be used in the present invention, include benzoyl peroxide, t-butylperoxy-2-ethylhexanoate, t-hexylperoxy-2-ethylhexanoate, and 2,2'-azobisisobutyronitrile.

The amount of these polymerization initiators is within a range from 0.1 to 2% by weight based on the radical polymerizable unsaturated monomer, and is preferably from 0.2 to 1% by weight in view of the polymerization stability and the durability of the coating film obtained from the waterborne resin emulsion.

A water-soluble polymerization initiator which isn't dissolved in the organosilicon compound such as persulfate can be used in combination as long as it does not lower the durability of the coating film of the waterborne coating of the present invention. It can be used in combination with the polymerization initiator, which is soluble in the non-radical polymerizable organosilicon compound in an amount less than 0.1% by weight based on the radical polymerizable unsaturated monomer.

When using this polymerization initiator, which is soluble in the non-radical polymerizable organosilicon compound, a hydrophilic decomposition component of a persulfate can be reduced to be as small as possible even when using a water-soluble polymerization initiator such as persulfate. Therefore, the coating film obtained from the waterborne coating containing the waterborne resin emulsion is superior in water resistance and weathering resistance.

The non-radical polymerizable organosilicon compound used in the present invention is not specifically limited as long as it is represented by the following formula:

$$(R^1)_n\text{-Si-}(R^2)_{4-n}$$

(wherein n represents an integer of 1 to 3, $R^1$ represents an alkyl, cycloalkyl or aryl group having 1 to 16 carbon atoms, and $R^2$ represents an alkoxy group having 1 to 8 carbon atoms or a hydroxyl group) and typical examples thereof include methyltrimethoxysilane, ethyltrimethoxysilane, isobutyltrimethoxysilane, n-hexyltrimethoxysilane, n-decyltrimethoxysilane, n-hexadecyltrimethoxysilane, phenyltrimethoxysilane, methyltriethoxysilane, ethyltriethoxysilane, n-hexyltriethoxysilane, n-octyltriethoxysilane, phenyltriethoxysilane, dimethyldimethoxysilane, diphenyldimethoxysilane, cyclohexylmethyldimethoxysilane, dimethyldiethoxysilane, diphenyldiethoxysilane, trimethylmethoxysilane, and trimethylethoxysilane. These compounds can be used alone or in combination.

Since these non-radical polymerizable organosilicon compounds can dissolve the polymerization initiator used in the present invention, the mixed solution (b) used in the present invention can be prepared by dissolving the polymerization initiator in the non-radical polymerizable organosilicon compound.

Although the amount of a monomer in the emulsion (a) of the monomer and the amount of the non-radical polymerizable organosilicon compound in the mixed solution (b) are not specifically limited, a ratio of the monomer to the non-radical polymerizable organosilicon compound is within a range from 99:1 to 30:70, and is preferably 95:5 to 50:50; the amount of the hydrolysate of the organosilicon compound is the following weight percentage based on the solid content of the waterborne resin emulsion.

The amount of the non-radical polymerizable organosilicon compound after the hydrolysis and condensation is preferably within a range from 1 to 50% by weight based on the solid content in the waterborne resin emulsion. When the amount is within the above range, the waterborne resin emulsion can be prepared satisfactorily without causing solidification of the waterborne resin emulsion due to excess non-radical polymerizable organosilicon compound, and thus the coating film of the resulting waterborne coating is superior in water resistance and weathering resistance. The amount is preferably within a range from 5 to 30% by weight.

Examples of the aqueous medium used in the present invention include water and water containing a water-soluble organic solvent.

The emulsion (a) of the monomer and the mixed solution (b) used in the present invention are simultaneously added in the aqueous medium, separately, which enables the emulsion polymerization reaction of the monomer having a radical polymerizable unsaturated bond as well as the hydrolysis reaction and condensation reaction of the non-radical polymerizable organosilicon compound to proceed simultaneously. In this case, the present invention also includes the case where a portion of the emulsion (a) of the monomer containing the polymerization initiator is added, and after carrying out the preliminary polymerization, the rest of the emulsion (a) and the mixed solution (b) are added.

After the completion of the emulsion polymerization reaction as well as the hydrolysis reaction and condensation reaction, the non-radical polymerizable organosilicon compound is preferably also added. The amount of silicone in the resin ultimately obtained can be adjusted by carrying out this step.

Specific method of preparing the waterborne resin emulsion of the present invention is not specifically limited, but includes the following method.

A monomer having a radical polymerizable unsaturated bond is added to deionized water in which an emulsifier is dissolved, thereby yielding an emulsion of a monomer. Separately, a polymerization initiator, which is soluble in a non-radical polymerizable organosilicon compound, is dissolved in the non-radical polymerizable organosilicon compound, thereby yielding a mixture of the non-radical polymerizable organosilicon compound and the polymerization initiator. Deionized water is charged in a reaction vessel, and after raising the temperature in the vessel to 80° C., the emulsion of the monomer and the mixture of the non-radical polymerizable organosilicon compound and the polymerization initiator are added dropwise, separately, over 2 to 4 hours. After the completion of the dropwise addition, the mixed solution is stirred for 30 minutes to one hour. Then, only the non-radical polymerizable organosilicon compound is added dropwise over 1 to 3 hours. After the completion of the dropwise addition, the mixed solution is stirred for 1 to 2 hours and is cooled, thereby making it possible to yield a waterborne resin emulsion of the present invention.

The waterborne resin emulsion of the present invention is suitable for use in building interior/exterior coatings, coatings for building materials, and household coatings, especially building exterior coatings and coatings for various building materials for external use in which excellent water resistance and weathering resistance are required.

The waterborne coating of the present invention is obtained by adding at least a thickener to the waterborne resin emulsion. Furthermore, additives such as pigments, coalescing agents, dispersants, wetting agents, defoamers, freezing inhibitors, bactericides, and leveling agents may be added.

Additives such as pigments, coalescing agents, dispersants, wetting agents, thickeners, defoamers, freezing inhibitors, and bactericides are not specifically limited and those used in conventional coatings can be used.

Examples of the method of adding additives described above in the waterborne resin emulsion include a method of directly adding pigments while stirring a waterborne resin emulsion (dry pigmentation method) and a method of previously kneading a dispersion of water, dispersants, and pigments and adding a waterborne resin emulsion in the dispersion (mill base method). In the case of the waterborne coating of the present invention, any method may be used.

The waterborne resin coating of the present invention is used in building interior/exterior coatings, coatings for building materials, and household coatings, and is particularly preferably used in building exterior coatings and coatings for building materials for external use because of excellent durability and weathering resistance.

EXAMPLES

The present invention will be described in detail by way of the following Examples; however, the present invention is not limited by the Examples. In the following Examples, parts and percentages are by weight unless otherwise specified.

Example 1 (Synthesis of waterborne resin emulsion)

A monomer mixed solution consisting of 200 parts of cyclohexyl methacrylate (hereinafter referred to as CHMA), 150 parts of methyl methacrylate (hereinafter referred to as MMA), 140 parts of butyl acrylate (hereinafter referred to as BA), 10 parts of acrylic acid (hereinafter referred to as AA) and 1.5 parts of A-174 (3-methacryloxypropyltrimethoxysilane, manufactured by Nippon Unicar Co., Ltd.) was added to 100 parts of deionozed water in which 20 parts of LEVENOL WZ (sodium polyoxyethylene nonyl phenyl ether sulfate, active component: 26%, manufactured by Kao Corporation) and 2.5 parts of NOIGEN EA170S (polyoxyethylene nonyl phenyl ether sulfate, active component: 80%, manufactured by Daiichi Kogyo Seiyaku Co., Ltd.) were dissolved, thereby yielding 624 parts of an emulsion of a monomer.

Separately, 510 parts of deionized water was charged in a 3 liter reaction vessel equipped with a stirrer, a thermometer, a condenser and a dropping funnel and the temperature in a kettle was raised to 80° C. while stirring with feeding a nitrogen gas. Then, 624 parts of the emulsion of the monomer and 90 parts of methyltrimetoxysilane in which 1.5 parts of Perbutyl O (t-butylperoxy-2-ethylhexanoate, manufactured by Nippon Oil & Fats Co., Ltd.) was dissolved were separately added dropwise over three hours. After the completion of the dropwise addition, the mixed solution was stirred at 80° C. for 30 minutes.

Then, 90 parts of methyltrimethoxysilane was added dropwise over one hour. After the completion of the dropwise addition, the mixed solution was stirred at 80° C. for 90 minutes. After cooling to 25° C. and neutralizing with ammonia water, the desired waterborne resin emulsion was obtained.

The waterborne resin emulsion showed the following properties.

The solid content was 45.9%, the viscosity was 630 mPa·s, the pH was 8.5, and the volume-average particle diameter was 130 nm.

"Micro-track particle size distribution measuring apparatus 9340-UPA" manufactured by NIKKISO Ltd. was used to measure the particle diameter.

Examples 2 to 7 and Comparative Examples 1 to 2 (Synthesis of waterborne resin emulsion)

The same operation as in Example 1 was carried out, except that the amount of deionized water charged initially in the reaction vessel, the composition of the emulsion of the monomer, the polymerization initiator and the non-radical polymerizable organosilicon compound were changed as shown in Table 1, Table 2, and Table 3, emulsion polymerization as well as hydrolysis and condensation were carried out, thereby synthesizing waterborne resin emulsions.

In the tables, the non-radical polymerizable organosilicon compound added dropwise in the reaction vessel, together with the emulsion of the monomer, was indicated by (1), while the non-radical polymerizable organosilicon compound added dropwise alone after the completion of the dropwise addition is indicated by (2).

TABLE 1

|  | Examples | | | |
|---|---|---|---|---|
|  | 2 | 3 | 4 | 5 |
| Deionized water charged initially | 500 | 510 | 520 | 520 |
| Emulsion of ionomer (a) | | | | |
| CHMA | 100 | 150 | 120 | 100 |
| NBMA | 150 | 100 | 80 | 200 |
| MMA | 130 | 80 | 130 | 65 |
| BA | 110 | 160 | 160 | 65 |
| St | | | | 60 |
| AA | 10 | 10 | 10 | 10 |
| A-174 | 1.5 | 1.5 | 1.5 | 1.5 |
| LEVENOL WZ | 20 | 20 | 20 | 20 |
| NOIGEN EA170S | 2.5 | 2.5 | 2.5 | 2.5 |
| Deionized water | 100 | 100 | 100 | 100 |
| Mixed solution (b) | | | | |
| Polymerization initiator | | | | |
| Perbutyl O | 1.5 | | 1.5 | 1.5 |
| Perhexyl O*1 | | 1.5 | | |
| Non-radical polymerizable organosilicon compound (1) | | | | |
| Methyltrimethoxysilane | 120 | 90 | 45 | 100 |
| Phenyltrimethoxysilane | | | 35 | |
| Non-radical polymerizable organosilicon compound (2) | | | | |
| Methyltrimethoxysilane | 120 | 90 | 45 | 100 |
| Phenyltrimethoxysilane | | | 35 | |
| Solid content (%) | 45.8 | 45.7 | 46.0 | 45.8 |
| Viscosity (mPa · s) | 452 | 540 | 820 | 320 |
| pH | 8.5 | 8.6 | 8.4 | 8.4 |
| Particle diameter (nm) | 128 | 132 | 135 | 130 |

*Perhexyl O (t-hexylperoxy-2-ethylhexanoate, manufactured by Nippon Oil & Fats Co., Ltd.)

TABLE 2

|  | Examples | | Comp. Examples | |
|---|---|---|---|---|
|  | 6 | 7 | 1 | 2 |
|  | 525 | 490 | 510 | 500 |
| Emulsion of ionomer (a) | | | | |
| CHMA | 230 | 130 | 200 | 100 |
| NBMA | 100 | 100 | | 150 |
| MMA | 70 | 120 | 150 | 130 |
| BA | 90 | 140 | 140 | 110 |
| AA | 10 | 10 | 10 | 10 |
| A-174 | 1.5 | 1.5 | 1.5 | 1.5 |
| LEVENOL WZ | 20 | 20 | 20 | 20 |
| NOIGEN EA170S | 2.5 | 2.5 | 2.5 | 2.5 |
| Deionized water | 100 | 100 | 100 | 100 |
| Polymerization initiator | | | | |
| Perbutyl O*2 | | | | 1.5 |
| Polymerization initiator | | | | |
| Ammonium persulfate*3 | | 0.1 | 0.5 | |
| Mixed solution (b) | | | | |
| Polymerization initiator | | | | |
| Perbutyl O | 1.5 | 1.5 | | |
| Non-radical polymerizable organosilicon compound (1) | | | | |
| Methyltrimethoxysilane | 90 | 90 | 90 | 120 |
| Phenyltrimethoxysilane | | | | |
| Non-radical polymerizable organosilicon compound (2) | | | | |
| Methyltrimethoxysilane | | | | 90 |

TABLE 2-continued

|  | Examples | | Comp. Examples | |
|---|---|---|---|---|
|  | 6 | 7 | 1 | 2 |
| Phenyltrimethoxysilane | 75 | | | |
| Solid content (%) | 45.8 | 45.7 | 45.8 | Large amount |
| Viscosity (mPa · s) | 550 | 830 | 320 | of blocks |
| pH | 8.6 | 8.5 | 8.5 | occurred |
| Particle diameter (nm) | 135 | 130 | 132 | |

*[2]This Perbutyl O is dissolved in a monomer having a radical polymerizable unsaturated bond to prepare a monomer emulsion (a)
*[3]This compound is added dropwise, separately, in the form of an aqueous 10% ammonia persulfate solution.

Examples 8 to 14 and Comparative Example 3 (Synthesis of waterborne resin emulsion)

Using the waterborne resin emulsions obtained in Examples 1 to 7 and Comparative Example 1, waterborne coatings were prepared according to the following formulation for enamel coatings.

TABLE 3

|  | Parts |
|---|---|
| (Pigment paste) | |
| Water | 80.66 |
| Disperbyk-190 (pigment dispersion wetting agent, manufactured by BYK-Chemie) | 16.25 |
| Ethylene glycol | 22.0 |
| SN Defoamer 373 (defoamer, manufactured by San-Nopco Co., Ltd.) | 1.3 |
| TIPAQUE R-930 (Lutile type titanium oxide, manufactured by Ishihara Sangyo) | 325.0 |
| (Letdown component) | |
| waterborne emulsions of Examples and Comparative Examples | 1012.5 |
| TEXANOL (coalescing agent, manufactured by Eastman Chemical) | 70.0 |
| Aqueous 5% solution of PRIMAL RW-8W (thickener, manufactured by Rohm & Haas) | 37.26 |
| SN Defoamer 373 (defoamer, manufactured by San-Nopco Co., Ltd.) | 1.3 |
| Water | 31.66 |
| 28% ammonia water | 0.3 |

Each of the waterborne coatings thus obtained was applied on a cement asbestos board using a brush and was dried by heating to 80° C. for 10 minutes to make test plates which were then subjected to water resistance tests and weathering tests. The evaluation results are shown in Table 4. The evaluation was carried out by the following procedures.

<Water resistance>

The test plate was dipped in tap water at 40° C. for 30 days and was then visually evaluated by the following five ranks.

Score 5: Neither swelling nor gloss reduction was observed
Score 4: Less swelling
Score 3: Less swelling and slight gloss reduction
Score 2: Some swelling and gloss reduction
Score 1: Nearly entire surface is swollen and significant gloss reduction was observed.

<Weathering resistance>

Using a Sunshine Weather O Meter (S80, manufactured by SUGA TEST INSTRUMENTS CO., LTD.), a weathering test was carried out for 4000 hours and a 60° specular gloss value was measured. Gloss retention was determined by dividing the specular gloss value after the test by that before test. Test conditions are as follows. A black panel temperature in the testing instrument was 63° C. and a water spray cycle was 18 minutes/120 minutes.

TABLE 4

|  | Water resistance | Gloss retention (%) |
|---|---|---|
| Examples | | |
| 8 | 5 | 87 |
| 9 | 5 | 83 |
| 10 | 5 | 85 |
| 11 | 5 | 85 |
| 12 | 5 | 83 |
| 13 | 5 | 89 |
| 14 | 5 | 82 |
| Comp. Examples | | |
| 3 | 3 | 75 |

What is claimed is:

1. A waterborne resin emulsion obtained by adding an emulsion (a) of a monomer having a radical polymerizable unsaturated bond, which is obtained by emulsifying the monomer in the presence of an emulsifier, and a mixed solution (b) of a non-radical polymerizable organosilicon compound represented by the following formula:

$$(R^1)_n-Si-(R^2)_{4-n}$$

(wherein n represents an integer of 1 to 3, $R^1$ represents an alkyl, cycloalkyl or aryl group having 1 to 16 carbon atoms, and $R^2$ represents an alkoxy group having 1 to 8 carbon atoms or a hydroxyl group) and a polymerization initiator, which is dissolved in the non-radical polymerizable organosilicon compound, in an aqueous medium; and simultaneously carrying out emulsion polymerization of the monomer having a radical polymerizable unsaturated bond and hydrolysis and condensation of the non-radical polymerizable organosilicon compound.

2. The waterborne resin emulsion according to claim 1, wherein additional non-radical polymerizable organosilicon compound is added and hydrolyzed and condensed after carrying out the emulsion polymerization, hydrolysis and condensation.

3. The waterborne resin emulsion according to claim 1, wherein the polymerization initiator, which is soluble in the non-radical polymerizable organosilicon compound, is a polymerization initiator whose decomposition temperature for achieving a half life of 10 hours is 75° C. or lower.

4. The waterborne resin emulsion according to claim 1, wherein the amount of the non-radical polymerizable organosilicon compound after the hydrolysis and condensation is within a range from 1 to 50% by weight based on the solid content therein.

5. The waterborne resin emulsion according to claim 1, wherein the monomer having a radical polymerizable unsaturated bond is a methacrylic acid alkyl ester, an alkyl group of which has 4 or more carbon atoms.

6. A waterborne coating comprising a waterborne resin emulsion obtained by adding an emulsion (a) of a monomer having a radical polymerizable unsaturated bond, which is obtained by emulsifying the monomer in the presence of an emulsifier, and a mixed solution (b) of a non-radical polymerizable organosilicon compound represented by the following formula:

$$(R^1)_n-Si-(R^2)_{4-n}$$

(wherein n represents an integer of 1 to 3, $R^1$ represents an alkyl, cycloalkyl, or aryl group having 1 to 16 carbon atoms, and $R^2$ represents an alkoxy group having 1 to 8 carbon atoms or a hydroxyl group) and a polymerization initiator, which is dissolved in the non-radical polymerizable organosilicon compound, in an aqueous medium; and simultaneously carrying out emulsion polymerization of the monomer having a radical polymerizable unsaturated bond and hydrolysis and condensation of the non-radical polymerizable organosilicon compound.

7. The waterborne coating according to claim 6, wherein additional non-radical polymerizable organosilicon compound is added and hydrolyzed and condensed after carrying out the emulsion polymerization, hydrolysis and condensation.

8. The waterborne coating according to claim 6, wherein the polymerization initiator, which is soluble in the non-radical polymerizable organosilicon compound, is a polymerization initiator whose decomposition temperature for achieving a half life of 10 hours is 75° C. or lower.

9. The waterborne coating according to claim 6, wherein the amount of the non-radical polymerizable organosilicon compound after the hydrolysis and condensation is within a range from 1 to 50% by weight based on the solid content in the waterborne resin emulsion.

10. The waterborne coating according to claim 6, wherein the monomer having a radical polymerizable unsaturated bond is a methacrylic acid alkyl ester, an alkyl group of which has 4 or more carbon atoms.

* * * * *

UNITED STATES PATENT AND TRADEMARK OFFICE
CERTIFICATE OF CORRECTION

PATENT NO. : 6,664,330 B2
DATED : December 16, 2003
INVENTOR(S) : Masahito Furo et al.

It is certified that error appears in the above-identified patent and that said Letters Patent is hereby corrected as shown below:

<u>Title page,</u>
Item [73], Assignee, change item "[73] Dainippon and Chemicals, Inc." to -- [73] Dainippon Ink and Chemicals, Inc. --

Signed and Sealed this

Thirteenth Day of July, 2004

JON W. DUDAS
*Acting Director of the United States Patent and Trademark Office*